United States Patent [19]

Reed

[11] Patent Number: 4,493,746

[45] Date of Patent: Jan. 15, 1985

[54] METHOD FOR REDUCTION OF OXIDES AND IMPROVING POROSITY OF METALIZED ZIRCONIUM OXIDE CERAMICS

[75] Inventor: Larry T. Reed, Richardson, Tex.

[73] Assignee: Axia Incorporated, Oak Brook, Ill.

[21] Appl. No.: 592,624

[22] Filed: Mar. 23, 1984

[51] Int. Cl.$^3$ ............................ C23F 1/02; B44C 1/22; C03C 15/00; C03C 25/06
[52] U.S. Cl. .................................... 156/644; 156/655; 156/656; 156/667; 204/410; 252/79.2
[58] Field of Search ............... 156/644, 655, 656, 667; 204/195 S; 252/79.2, 79.3

[56] References Cited

U.S. PATENT DOCUMENTS

| | | | |
|---|---|---|---|
| 3,120,457 | 2/1964 | Duddy | 156/656 |
| 4,184,941 | 1/1980 | Carlin | 156/656 |
| 4,327,122 | 4/1982 | Chakupurakal | 156/667 X |

FOREIGN PATENT DOCUMENTS

| | | | |
|---|---|---|---|
| 53-72021 | 6/1978 | Japan | 156/667 |
| 0132763 | 10/1979 | Japan | 156/667 |

*Primary Examiner*—William A. Powell
*Attorney, Agent, or Firm*—Richards, Harris & Medlock

[57] ABSTRACT

A method is provided for increasing the porosity of sintered metal coatings on zirconium oxide ceramics comprising the placing of the metallic coated zirconium oxide part in an acid solution, heating the solution to a temperature below the boiling temperature of the acid, maintaining the part in the acid solution for a sufficient period of time to increase the porosity to a predetermined amount, and removing the part from the acid solution.

16 Claims, No Drawings

4,493,746

METHOD FOR REDUCTION OF OXIDES AND IMPROVING POROSITY OF METALIZED ZIRCONIUM OXIDE CERAMICS

TECHNICAL FIELD

This invention relates to the improvement of porosity and reduction of oxides from metallic films covering stabilized zirconium oxide electrolytes. In particular, the invention relates to a method utilizing an acid wash of the metallic film after it has been applied and sintered, to achieve reduction of oxides and to increase the porosity.

BACKGROUND ART

Stabilized zirconium oxide ceramics are used as electrolytes in oxygen sensing devices. These zirconium oxide ceramics are frequently stabilized as to one crystal structure by the addition of a stabilizing agent such as yttrium oxide, calcium oxide or ytterbium oxide. The ceramics formed by the stabilized zirconium oxide are normally covered with a porous conductive film on both sides. One side of the stabilized zirconium oxide electrolyte is exposed to a standard such as air and the other side of the ceramic is exposed to exhaust gases. The zirconium oxide is conductive for oxygen ions and by measuring changes in electric potential across the zirconium oxide ceramic it is possible to monitor the carbon monoxide content of exhaust gases. This in turn allows the electrical impulses to be fed to a computer to adjust air and fuel ratios to provide for more complete combustion. Such oxygen sensing devices have come into common use on internal combustion engines such as automobile engines to reduce polluting emissions.

The conductive film applied to the stabilized zirconium ceramic is generally platinum. The coating must be porous in order to permit oxygen ion transfer. The metallic films have been applied by flame spray techniques, sputtering techniques and the use of thick film techniques has been suggested. Flame spray and sputtering techniques are expensive. Prior thick film techniques have the disadvantage of having a low porosity. Thick film is desirable, however, from an economic standpoint as well as for uniformity of film thickness.

The present invention provides a process which allows the utilization of thick film techniques in the metallizing of stabilized zirconium oxide electrolytes while achieving high porosity of the metallized film. The present process can also be used with flame spray or sputtered metallized coatings to improve their porosity.

SUMMARY OF THE INVENTION

In one aspect the present invention relates to the method for treatment of a zirconium oxide electrolyte to which a sintered metallized coating has been applied. After a metal coating has been applied to the zirconium oxide ceramic electrolyte it is sintered. The method of the present invention involves placing the sintered metallized zirconium oxide ceramic into an acid solution, heating the acid solution to a temperature below its boiling point and maintaining the ceramic in the acid solution for a period of time sufficient to reduce oxides from the metallized film and to increase the porosity of the metallized film to a predetermined degree of porosity.

In another aspect the present invention relates to a preferred embodiment for treatment of the platinum metallized coating of a zirconium oxide ceramic. After the platinum coating has been sintered, the ceramic is placed as an aqua regia solution of about 0.7 to about 1.5 normal. The solution is heated in the range from about 100° to about 150° F. The ceramic is maintained in the acid solution for a period of time sufficient to reduce metal oxides from the platinum film and to increase the porosity of the film to a predetermined amount.

DETAILED DESCRIPTION

The manufacture of stabilized zirconium oxide ceramic electrolytes is known, and suitable methods are disclosed in British Pat. No. 1,591,781 and my copending application Ser. No. 592,625 filed Mar. 23, 1984. A device using a metallized $ZrO_2$ ceramic is disclosed in my copending application Ser. No. 592,626, filed Mar. 23, 1984. Both of my copending applications are hereby incorporated by reference. Such zirconium oxide electrolyte ceramics are the types commonly used in oxygen sensing devices after a metallized coating has been applied. The most common metallized coating is a platinum coating. The method of the present invention can be utilized with flame sprayed or sputtered platinum coated zirconium ceramics or with metallized ceramics in which the platinum coating has been applied by thick film techniques. Because the thick film technique is desirable for economic reasons, the method of the present invention shall be described in reference to a thick film process.

The zirconium oxide ceramic parts are visually inspected for deformities, broken parts, chips, cracks and holes. Parts free from visually deformities are then preferably dye inspected. Dye inspection involves placing the parts in a solution of dye and solvent. For example a suitable dye solvent mixture is a 5% by volume of Carbol Fuchsin (K) and 95% by volume isoproponol for a period of about 15 minutes. The parts are removed from the dye solution and rinsed with water to remove surface dye. The elements are dried with hot air and then visually inspected for cracks by observing any dye penetration.

After inspection the parts are abraded on those portions to be coated. Abrasion of the element is utilized to improve adherence of the deposited metal layer. The parts can be abraded with aluminum oxide having a particle size of 10 to 30 microns. The surface is preferably abraded to a roughness of 40 to 45 microinches RMS. Following abrasion the part is degreased. Degreasing can be done utilizing a solvent rinse. The part is preferably dried by ramping the part at a rate of 250° C. per hour up to a temperature in the range of from 500° to 600° C. for sufficient time to drive off any solvent residue. As used herein "ramping" or "ramped" means the raising or lowering of the temperature over a period of time. Generally no more than 30 minutes is required at the maximum temperature. The part is ramped back to ambient temperature at a rate of approximately 250° C. per hour. Ramping the temperature is done to avoid thermal shock to the part. Other heating or cooling rates may be utilized provided thermal shock is avoided. If the parts are not immediately processed they are stored in a nitrogen atmosphere.

Prior to coating the parts it is preferable to test the surface for cleanliness. This is accomplished by placing the parts in a fluorescent dye solution. The parts are removed and rinsed with deionized or distilled water and exposed to ultraviolet light. Thereafter they are visually inspected for luminous areas. If luminous areas are found they are again degreased and spray rinsed as discussed above. Thick film metallizing is conducted by coating the surfaces of the part. Frequently these parts are in a roughly conical shape and a porous metallic film is applied to the inside and outside of the cone. The part can be coated on the inside by applying a thick film to the complete inside area. The thick film compositions as applied are frequently referred to as an "ink". After the thick film ink is applied to the inside of the part the ink is dried. Preferably it is dried by heating of the part to a temperature in the range of from 125° to 150° C. Suitable platinum thick film inks are commercially available such as that from Cermalloy such as sold under the tradename CL-5100. A suitable platinum thick film ink is also available from DuPont. Such thick film inks are formulated such that the platinum film will be porous after it has been sintered, will possess a low resistivity, and will adhere to the stabilized zirconium oxide ceramic. Those thick film compositions generally include platinum, platinum oxide, and other metals such as copper and silver in minor amounts and organic vehicles.

After the inside of the part has been coated the thick film ink is applied to the outer electrode area of the part and is again dried, preferably at a temperature in the range of from 125° to 150° C.

After the metal film has been applied to the desired areas of the parts, the metal film is then sintered. This is accomplished by placing the parts which have been coated with the metal film in an oven and arranging them in the oven such that there is maximum air circulation over, under and across each part. Air flow should be maintained through the oven to carry off fumes from the vaporating organic vehicles utilized in the thick film ink compositions. The part is ramped to a temperature of about 500° C. at a rate of about 250° C. per hour and then maintained at about 500° C. for a sufficient time to drive off the organic vehicles. Normally less than one hour at about 500° C. is sufficient. The part is then ramped to a temperature of about approximate 1000° C. at a rate of approximate about 250° C. per hour. The temperature is held at approximate 1000° C. for a sufficient period of time to sinter the applied platinum coating. Generally two hours is sufficient to sinter the applied coating. The part is then returned to room temperature by ramping the temperature down to ambient room temperature at a rate of approximately 250° C. per hour. Once again the ramping serves to prevent thermal shock to the part. Also during the period when the organic vehicle is driven off ramping serves to permit the slow evaporation of the organics thus preventing bubbling or blisters in the film. Other ramping rates can be used.

The thick film process has been limited in its commercial use because the other metals, impurities and additives utilized in the formulation of the thick film ink oxidize when the coating is sintered and plug the pores of the platinum. Further while these ingredients are useful for the formulation of the thick film inks some are not desired as components of the sintered platinum coating. The most desired platinum coating has a high level of porosity to create 3 phase boundries to permit the migration of oxygen ions and to maintain low coating resistivity by minimizing other components. The present invention overcomes the disadvantages resulting from sintered thick film platinum coatings by providing a method for the reduction of oxides from the coating and also for increasing the porosity of the coating. Porosity is increased in two manners, by reducing the oxides and/or by dissolving a small layer of metal coating at the pore walls thereby increasing the size of the pores.

The present invention provides for the reduction of oxides from the platinum coating by placing the parts in an acid bath for a sufficient period of time to reduce the undesired oxides. Preferably, the acid solution is heated so as to speed the reaction time. Further it is also desirable that the acid has some effect upon the platinum such that a small layer of platinum can be removed from the pores thereby increasing the porosity of the coating. Suitable acids include aqua regia, hydrochloric acid, nitric acid, sulfuric acid, phosphoric acid, or hydrofluoric acids. While sulfuric acid and phosphoric acid are useful in reducing oxides present they are less desired because they have very negligible effect on the platinum. Thus while sulfuric acid and phosphoric acid open up pores by removal of other metal oxides they have little effect on improving the porosity by removing a small portion of the platinum itself. Hydrofluoric acid while acceptable is not desired because of the health hazards associated with its use. The most preferred acid is aqua regia because it is effective in reducing the oxides and dissolving platinum.

Aqua regia (nitrohydrochloric acid) is a mixture of nitric acid and hydrochloric acid generally in a ratio of one part nitric acid to three of four parts hydrochloric acid. While many concentrations of aqua regia are useful it is preferred that the aqua regia solution be in the range of 0.7 to 1.5N.

The factors affecting the acid wash of the applied coating are the acid selected, the concentration of the acid, the temperature of the acid solution, and the time the part is suspended in the acid solution. These factors can be varied by those skilled in the art with a minimum of experimentation to achieve the desired porosity. In the preferred embodiment aqua regia is used in a concentration of 0.7N to 1.5N. This solution is relatively safe to handle, while being fast acting but not so fast acting as to prevent control of the process. In the preferred embodiment the aqua regia solution is heated to a temperature in the range of from 100° F. to 150° F. It is desirable to prevent boiling of the acid solution. The part is maintained in the aqua regia solution for a period of time sufficient to remove the unwanted oxides and to also remove a small amount of platinum to increase the platinum coating porosity. In general the use of a 1 normal aqua regia solution heated to a temperature of 150° F. for approximately 13 to 17 minutes has been found suitable. In general the desired porosity of the coating to be achieved is from about 50 to about 60%. Porosity being measured by visual sampling under a microscope, and preferably an electronic microscope.

The part is removed from the acid solution and then rinsed with deionized or distilled water. Next the part is placed in a base for a period of time sufficient to neutralize the acid. Any base which does not leave a residue on the part is acceptable. Preferably the base is a 10% ammonia solution and the part is soaked in that solution for a sufficient period to neutralize the acid, approximately 5 minutes as been found sufficient. The part is removed from the base solution, rinsed with deionized water or distilled water and dried. It has been found that drying the part at 150° F. for a period of 10 minutes is generally sufficient.

After the acid treatment the metallized coating may be spinelled or protectively coated as known in the art. The spinel may be a natural oxide such as $MgAl_2O_4$ or can be one of the synthetics spinels such as magnesia-alumina or magnesia-chromia. Spinelling is accomplished by preheating the metallized coated part to about 400° C. Thereafter the part is spinelled by plasma spray techniques to a thickness of approximately 4 mils. Other protective coatings are applied in similar manner.

While the present invention has been described in relation to its preferred embodiments, it is to be understood that various modifications thereof will be apparent to those of ordinary skill in the art upon reading the specification and it is intended to cover all such modifications as fall within the scope of the appended claims.

I claim:

1. A process for increasing the porosity of thick film deposited sintered metallic coatings comprising:
   (a) placing a part which has a sintered metallic coating in an acid solution;
   (b) heating said solution to a temperature below its boiling point; and
   (c) maintaining said part in said heated solution for a period of time sufficient to increase the porosity of the metallized coating to a predetermined amount.

2. The process of claim 1 wherein said acid is selected from the group consisting of aqua regia, hydrochloric acid, nitric acid, hydrofluoric acid, sulfuric acid, or phosphoric acid.

3. The process of claim 1 wherein said acid is selected from the group comprising aqua regia, hydrochloric acid, nitric acid, or hydrofluoric acid.

4. The process of claim 1 wherein said acid is aqua regia.

5. The process of claim 3 wherein said metallized coating is a sintered platinum coating.

6. The process for increasing the porosity of a sintered platinum coating on a stabilized zirconium ceramic comprising the steps of:
   (a) placing a zirconium oxide ceramic which has been coated with a sintered platinum coating in an acid solution;
   (b) heating the solution to a temperature below the boiling point of the acid; and
   (c) maintaining said ceramic in said heated acid solution for a period of time sufficient to increase the porosity of the sintered platinum coating to a predetermined amount.

7. The process of claim 6 wherein said acid is selected from the group consisting of aque regia, hydrochloric acid, nitric acid, hydrofluoric acid, sulfuric acid, or phosphoric acid.

8. The process of claim 6 wherein said acid is selected from the group consisting of aqua regia, hydrochloric acid, nitric acid, or hydrofluoric acid.

9. The process of claim 6 wherein said acid is aqua regia.

10. The process of claim 6 wherein said acid solution is an aqua regia solution in concentration of from about 0.7 to about 1.5N.

11. The process of claim 10 wherein said acid is in a concentration of 1N.

12. The process of claim 10 wherein said acid solution is heated to a temperature in the range from 100° F. to 150° F.

13. The process of claim 12 wherein said part is maintained in said acid solution for about 13 to 17 minutes.

14. The process of claim 9 further comprising the steps of:
   (a) rinsing said ceramic with distilled or deionized water;
   (b) placing said ceramic in a base solution for a period of time sufficient to neutralize any acid remaining in said ceramic; and
   (c) removing said ceramic and rinsing off said ceramic with distilled or deionized water.

15. The process of claim 14 wherein said base is an ammonia solution.

16. The process of claim 15 wherein said part is maintained in the base solution for at least 5 minutes.

* * * * *

UNITED STATES PATENT AND TRADEMARK OFFICE
CERTIFICATE OF CORRECTION

PATENT NO. : 4,493,746
DATED : Jan. 15, 1985
INVENTOR(S) : Larry T. Reed

It is certified that error appears in the above-identified patent and that said Letters Patent is hereby corrected as shown below:

Column 2, line 2, change "placed as an" to read
-- placed is an --.

*Signed and Sealed this*

*Twenty-second* Day of *October 1985*

[SEAL]

Attest:

DONALD J. QUIGG

*Attesting Officer*  *Commissioner of Patents and Trademarks—Designate*